United States Patent
Okamura et al.

(10) Patent No.: US 11,787,395 B2
(45) Date of Patent: Oct. 17, 2023

(54) AUTOMATED VALET PARKING SYSTEM

(71) Applicant: Toyota Jidosha Kabushiki Kaisha, Toyota (JP)

(72) Inventors: Ryuji Okamura, Gotemba (JP); Tatsuya Sugano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 15 days.

(21) Appl. No.: 17/027,838

(22) Filed: Sep. 22, 2020

(65) Prior Publication Data
US 2021/0122360 A1 Apr. 29, 2021

(30) Foreign Application Priority Data

Oct. 24, 2019 (JP) .................................. 2019-193652

(51) Int. Cl.
*B60W 30/06* (2006.01)
*B60W 60/00* (2020.01)

(52) U.S. Cl.
CPC ........ *B60W 30/06* (2013.01); *B60W 60/0025* (2020.02); *B60W 2540/041* (2020.02); *B60W 2554/4029* (2020.02)

(58) Field of Classification Search
CPC ............. B60W 30/06; B60W 60/0025; B60W 2554/4029; B60W 2540/041
See application file for complete search history.

(56) References Cited

U.S. PATENT DOCUMENTS

2019/0163204 A1* 5/2019 Bai ..................... G05D 1/0088
2019/0243368 A1* 8/2019 Seki ................ B60W 60/00253

FOREIGN PATENT DOCUMENTS

| JP | H0510046 A | * | 1/1993 |
| JP | 2018180831 A | | 11/2018 |
| JP | 2019-066932 A | | 4/2019 |
| WO | WO-2017180366 A1 | * | 10/2017 |

OTHER PUBLICATIONS

Ogasawara Kunihiro, JPH0510046A—Machine Translation (Year: 1993).*
https://www.youtube.com/watch?v=XVIIJaUfBV4 (Year: 2015).*

* cited by examiner

*Primary Examiner* — Anne Marie Antonucci
*Assistant Examiner* — Jingli Wang
(74) *Attorney, Agent, or Firm* — Dinsmore & Shohl LLP

(57) ABSTRACT

Provided is an automated valet parking system that automatically moves an autonomous driving vehicle to a pick-up space of a parking place by issuing an instruction to the autonomous driving vehicle parked in the parking place according to a pick-up request from a user. The system includes a user position determination unit configured to determine whether or not a user frontend of the user is located in a preset pick-up area or a preset near-pick-up area including the pick-up space, a pick-up request reception unit configured to receive the pick-up request when the user position determination unit determines that the user frontend is located in the pick-up area or the near-pick-up area, and a vehicle instruction unit configured to instruct the autonomous driving vehicle that is a target of the pick-up request to move to the pick-up space when the pick-up request reception unit receives the pick-up request.

12 Claims, 6 Drawing Sheets

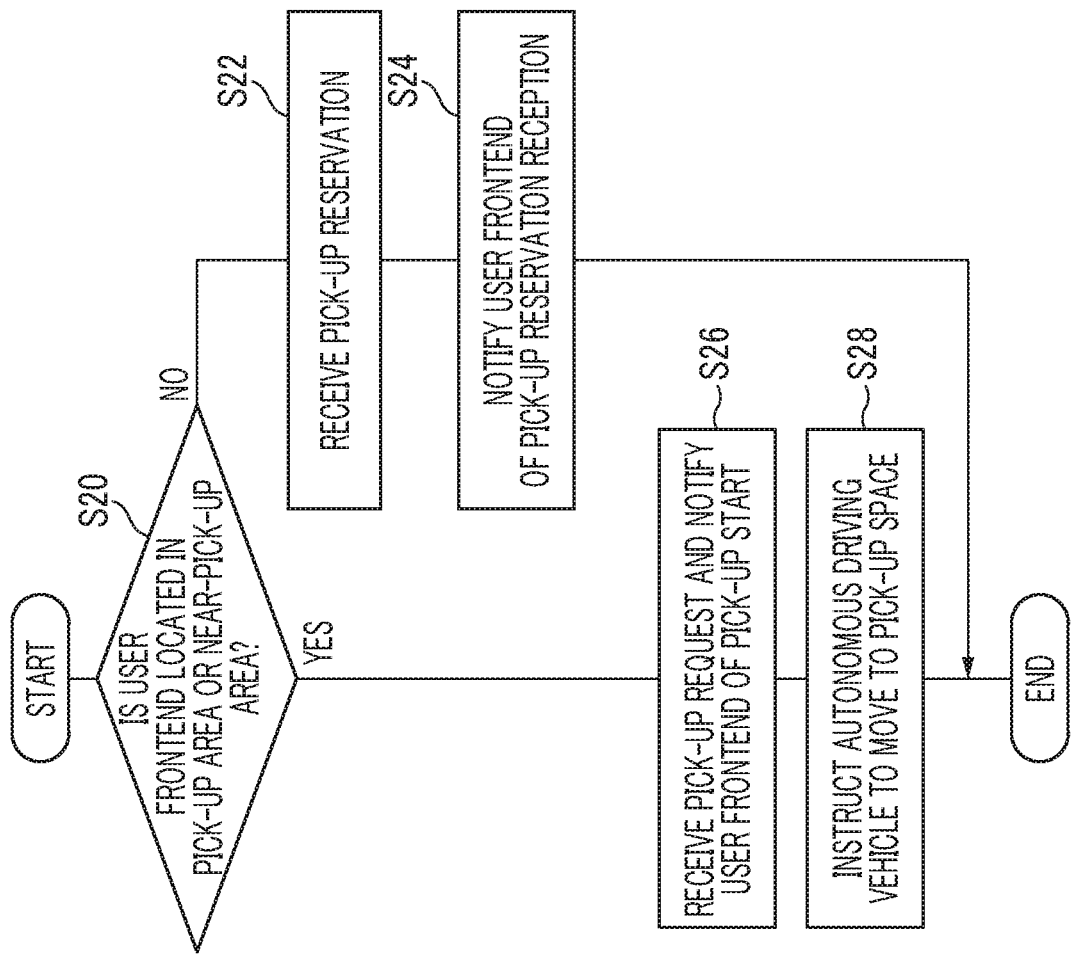
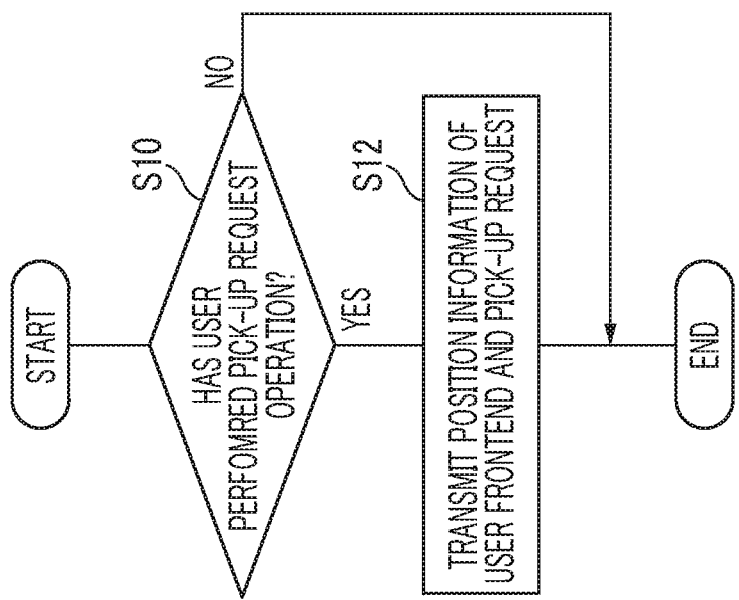

000# AUTOMATED VALET PARKING SYSTEM

CROSS REFERENCE TO RELATED APPLICATION

This application claims priority to Japanese Patent Application No. 2019-193652 filed on Oct. 24, 2019, the content of which is incorporated herein by reference in its entirety.

BACKGROUND

Technical Field

The disclosure relates to an automated valet parking system.

Description of Related Art

In the related art, Japanese Unexamined Patent Application Publication No. 2019-066932 (JP 2019-066932 A) is known as a technical document relating to an automated valet parking system. The publication discloses a management device that carries out pick-up of a vehicle from a parking place by autonomous driving of the vehicle, in which a current position of a user is acquired when a pick-up instruction is issued by the user, and the time at which the user arrives at a scheduled pick-up position of the vehicle is estimated from the current position of the user to adjust a pick-up time of the vehicle.

SUMMARY

However, in the above-described management device, since the straight-line distance between the current position of the user and the scheduled pick-up position is used, depending on the path on which the user reaches the parking place, there is a possibility that the vehicle may wait for a long time at the scheduled pick-up position without being able to appropriately adjust the pick-up time.

An aspect of the disclosure relates to an automated valet parking system that automatically moves an autonomous driving vehicle to a pick-up space of a parking place by issuing an instruction to the autonomous driving vehicle parked in the parking place according to a pick-up request from a user. The system includes a user position determination unit configured to determine whether or not a user frontend of the user is located in a preset pick-up area or a preset near-pick-up area including the pick-up space, a pick-up request reception unit configured to receive the pick-up request when the user position determination unit determines that the user frontend is located in the pick-up area or the near-pick-up area, and a vehicle instruction unit configured to instruct the autonomous driving vehicle that is a target of the pick-up request to move to the pick-up space when the pick-up request reception unit receives the pick-up request.

With the automated valet parking system according to the aspect of the disclosure, when the user position determination unit determines that the user frontend is located in the pick-up area or the near-pick-up area including the pick-up space, since a pick-up request from the user frontend is received and the autonomous driving vehicle is instructed to move to the pick-up space, it is possible to suppress the autonomous driving vehicle from waiting for a long time in the pick-up space due to a delay in arrival of the user as compared to the case where the pick-up request is received even though the user is not in the pick-up area or the near-pick-up area.

In the automated valet parking system according to the aspect of the disclosure, the near-pick-up area may include at least a part of a parking place-side elevator hall located on the same floor as the pick-up space of the parking place, and at least a part of another floor elevator hall where an elevator of the parking place-side elevator hall stops on a different floor from the parking place-side elevator hall.

With the automated valet parking system, since the near-pick-up area includes at least a part of another floor elevator hall on the different floor from the parking place as well as the parking place-side elevator hall near the parking place, it is possible to improve the convenience of the user as compared to the case where the pick-up reservation reception is not performed until the user gets off on the same floor as the parking place.

In the automated valet parking system according to the aspect of the disclosure, in a case where the user position determination unit does not determine that the user frontend is located in the pick-up area or the near-pick-up area when the pick-up request is made, the pick-up request reception unit may perform a pick-up reservation reception which receives the pick-up request as a reservation, and in a case where the user position determination unit determines that the user frontend is located in the pick-up area or the near-pick-up area after the pick-up reservation reception is performed, the pick-up request reception unit may automatically receive the pick-up request.

With the automated valet parking system, since the pick-up reservation reception is performed even in a case where determination is not made that the user frontend is located in the pick-up area or near-pick-up area when the pick-up request is made, since the pick-up request reception is performed, and the pick-up request is automatically received when determination is made that the user frontend is located in the pick-up area or the near-pick-up area, it is possible to improve the convenience of the user as compared to the case where the user has to make a pick-up request again after entering the pick-up area or the near-pick-up area.

According to the aspect of the disclosure, it is possible to suppress the autonomous driving vehicle from waiting for a long time in the pick-up space due to a delay in arrival of the user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a flowchart illustrating an example of a pick-up request process in a user frontend;

FIG. 5B is a flowchart illustrating an example of a pick-up process in the parking place management server.

DETAILED DESCRIPTION

Hereinafter, an embodiment of the disclosure will be described with reference to the drawings.

Figure 1:
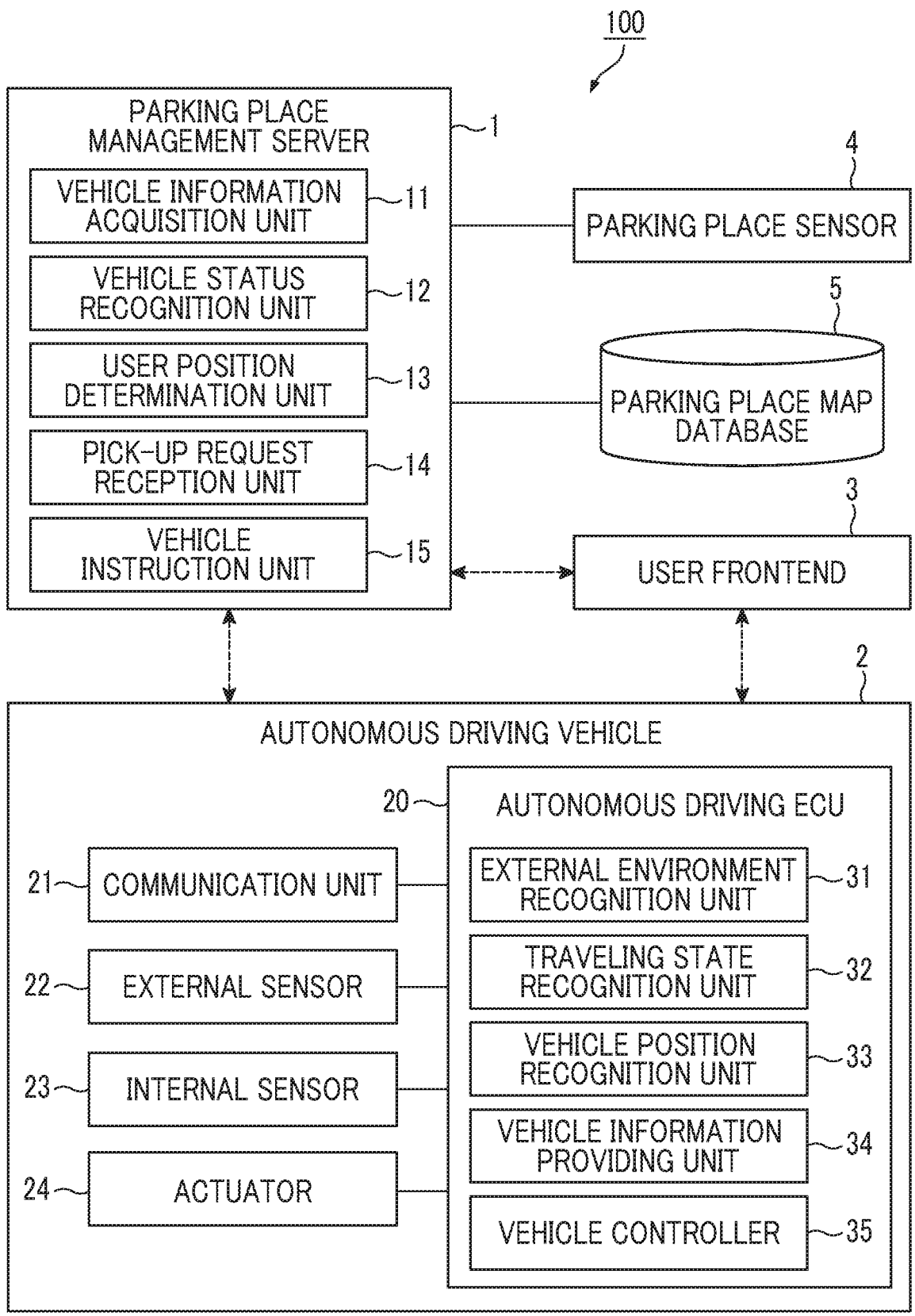
FIG. 1 is a block diagram illustrating an example of an automated valet parking system according to an embodiment.

FIG. 1 is a block diagram illustrating an automated valet parking system 100 according to an embodiment. The automated valet parking system (AVPS) 100 illustrated in FIG. 1 is a system for performing automated valet parking of a plurality of autonomous driving vehicles 2 in a parking place.

The automated valet parking is a service that allows a driverless autonomous driving vehicle 2, after a user (occupant) has got out of the vehicle at a drop-off zone in a parking place, to travel on a target route according to an instruction from the parking place side, and that automatically parks the vehicle in a target parking space in the parking place. The target parking space is a preset parking space as a parking position of the autonomous driving vehicle 2. The target route is a route in the parking place where the autonomous driving vehicle 2 travels to reach the target parking space. Note that, the target route at the time of pick-up is a route on which the vehicle travels to reach a pick-up space to be described later.

The parking place may be a parking place dedicated to automated valet parking, or may also serve as a parking place for general vehicles that are not subject to automated valet parking. A part of the parking place for general vehicles may be used as an area dedicated to automated valet parking. In the present embodiment, a parking place dedicated to automated valet parking will be used as an example for description.

Figure 2:
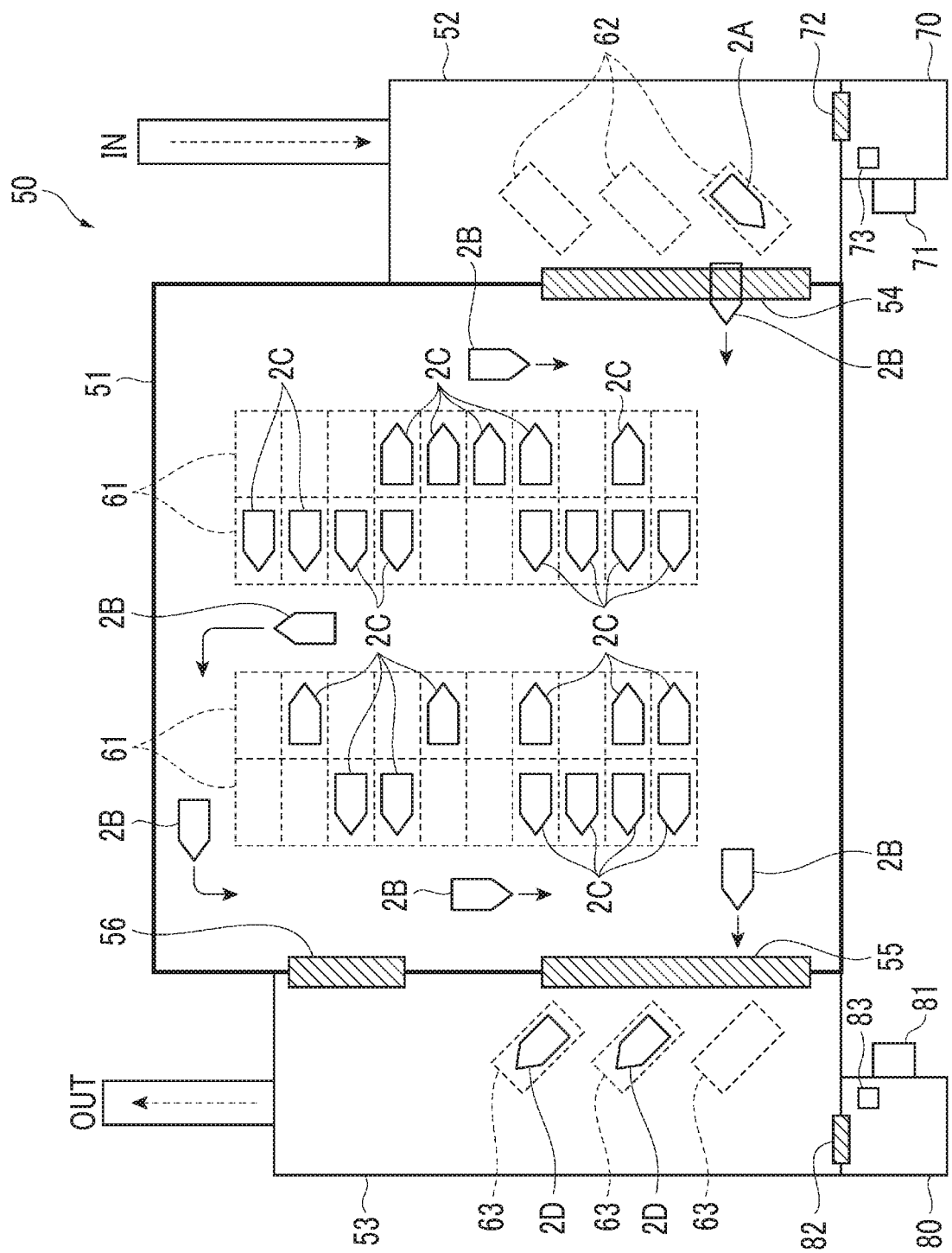
FIG. 2 is a plan view illustrating an example of a parking place where automated valet parking is performed.

Here, FIG. 2 is a plan view illustrating an example of a parking place where automated valet parking is performed. FIG. 2 illustrates a parking place 50 for automated valet parking, a parking area 51, a drop-off zone 52, and a pick-up zone 53. The parking place 50 is, for example, an in-facility parking place. The parking place 50 can be an underground parking place provided under the facility. Note that, the parking place 50 may be an outdoor parking place outside the facility. The parking place 50 includes the parking area 51, the drop-off zone 52, and the pick-up zone 53.

The parking area 51 is a place where a parking space (parking frame) 61 in which the autonomous driving vehicle 2 is parked by the automated valet parking is formed. As illustrated in FIG. 2, for example, a plurality of the parking spaces 61 are formed side by side in one direction (for example, the vehicle width direction of a parked vehicle).

The drop-off zone 52 is provided on the entrance side of the parking place 50, and is a place where an occupant including a user gets out of the autonomous driving vehicle 2 before entering the parking place. The drop-off zone 52 is formed with a drop-off space 62 for the autonomous driving vehicle 2 to stop when the occupant gets out of the vehicle. The drop-off zone 52 communicates with the parking area 51 via an entrance gate 54.

The drop-off zone 52 is connected to a facility entrance elevator hall 70 for the user who gets out of the autonomous driving vehicle 2 to enter a facility such as a commercial facility. The facility entrance elevator hall 70 does not need to be directly connected to the drop-off zone 52, and may be connected via a passage or the like. The facility entrance elevator hall 70 is provided with an elevator 71 for moving the vehicle to a different floor, a facility entrance-side automatic door 72 between the facility entrance elevator hall 70 and the drop-off zone 52, and an entrance-side reception device 73. The entrance-side reception device 73 is a device for receiving a vehicle entrance request for starting automated valet parking.

The pick-up zone 53 is provided on the exit side of the parking place 50, and is a place where the occupant gets on the autonomous driving vehicle 2 that has been picked up. The pick-up zone 53 is formed with a pick-up space 63 where the autonomous driving vehicle 2 waits for the occupant to get on the vehicle. The pick-up zone 53 communicates with the parking area 51 via an exit gate 55. In addition, a return gate 56 for returning the autonomous driving vehicle 2 from the pick-up zone 53 to the parking area 51 is provided between the pick-up zone 53 and the parking area 51. Note that, the return gate 56 is not indispensable.

The pick-up zone 53 is connected to a facility exit elevator hall (parking place-side elevator hall) 80 for the user to return to the parking place 50 from the facility such as a commercial facility. The facility exit elevator hall 80 does not need to be directly connected to the pick-up zone 53, and may be connected via a passage or the like. The facility exit elevator hall 80 is provided with an elevator 81 for moving the vehicle to a different floor, a facility exit-side automatic door 82 between the facility exit elevator hall 80 and the pick-up zone 53, and an exit-side reception device 83.

The exit-side reception device 83 is a device for receiving a pick-up request of the autonomous driving vehicle 2 parked in the parking area 51 by the automated valet parking. The pick-up request is a request made by the user to pick up the autonomous driving vehicle 2. The exit-side reception device 83 has a function of receiving a pick-up request by short-range communication with a user frontend 3 in addition to the direct operation. As the short-range communication, for example, Bluetooth Low Energy (BLE, Bluetooth is a registered trademark) or Near Field Communication (NFC) can be used. In addition, the exit-side reception device 83 can perform short-range communication with the user frontend 3 at a remote location using an in-facility network and an in-facility terminal.

Note that, the drop-off zone 52 and the pick-up zone 53 do not need to be provided separately, and may be provided as an integrated platform. In this case, the facility entrance elevator hall 70 and the facility exit elevator hall 80 can be an integrated elevator hall. In addition, the entrance-side reception device 73 and the exit-side reception device 83 do not need to be provided separately, and one reception device may be provided.

FIG. 2 illustrates an autonomous driving vehicle 2A stopped at the drop-off space 62 of the drop-off zone 52, autonomous driving vehicles 2B traveling in the parking place 50, autonomous driving vehicles 2C parked in the parking space 61 of the parking area 51, and autonomous driving vehicles 2D stopped at the pick-up space 63 of the pick-up zone 53.

In the automated valet parking system 100, for example, after the autonomous driving vehicle 2 that has entered the parking place 50 drops off the occupant in the drop-off space 62 (corresponding to the autonomous driving vehicle 2A), the automated valet parking is started by obtaining an instruction authority of the autonomous driving vehicle 2. The automated valet parking system 100 allows the autonomous driving vehicle 2 to travel toward a target parking space in the parking area 51 (corresponding to the autonomous driving vehicle 2B), and parks the autonomous driving vehicle 2 in a target parking space (corresponding to the autonomous driving vehicle 2C). The automated valet parking system 100 allows the autonomous driving vehicle 2 that is parked to travel toward the pick-up zone 53 in response to a pick-up request, and allows the autonomous driving vehicle 2 to wait for the occupant to arrive in the pick-up space 63 (corresponding to the autonomous driving vehicle 2D).

Configuration of Automated Valet Parking System

Hereinafter, the configuration of the automated valet parking system 100 will be described with reference to the drawings. As illustrated in FIG. 1, the automated valet parking system 100 includes a parking place management server 1. The parking place management server 1 is a server for managing the parking place.

The parking place management server 1 is configured to be able to communicate with the autonomous driving vehicle 2 and the user frontend 3. The details of the autonomous driving vehicle 2 and the user frontend 3 will be described later. The parking place management server 1 may be provided in the parking place or may be provided in a facility away from the parking place. The parking place management server 1 may include a plurality of computers provided at different locations.

The parking place management server 1 is connected to a parking place sensor 4 and a parking place map database 5. The parking place sensor 4 is a sensor for recognizing a status in the parking place 50. The parking place sensor 4 includes an empty sensor for detecting whether or not a parked vehicle is present in each parking space (whether each parking space is full or empty).

The empty sensor may be provided for each parking space, or may be provided on a ceiling or the like so as to be able to monitor a plurality of parking spaces by one. The configuration of the empty sensor is not particularly limited, and a known configuration can be employed. The empty sensor may be a pressure sensor, a radar sensor or a sonar sensor using radio waves, or a camera. The empty sensor transmits detection information of the parked vehicle in the parking space to the parking place management server 1.

The parking place sensor 4 may include a surveillance camera for detecting the autonomous driving vehicle 2 traveling on the traveling path of the parking place 50. The surveillance camera is provided on a ceiling or a wall of the parking place, and captures an image of the traveling autonomous driving vehicle 2. The surveillance camera transmits the captured image to the parking place management server 1.

The parking place map database 5 is a database that stores parking place map information. The parking place map information includes position information of the parking space in the parking place, position information of the drop-off space, position information of the pick-up space, and information of the traveling path in the parking place. In addition, the parking place map information includes position information of a landmark used by the autonomous driving vehicle 2 for position recognition. The landmark will be described later.

Figure 3:
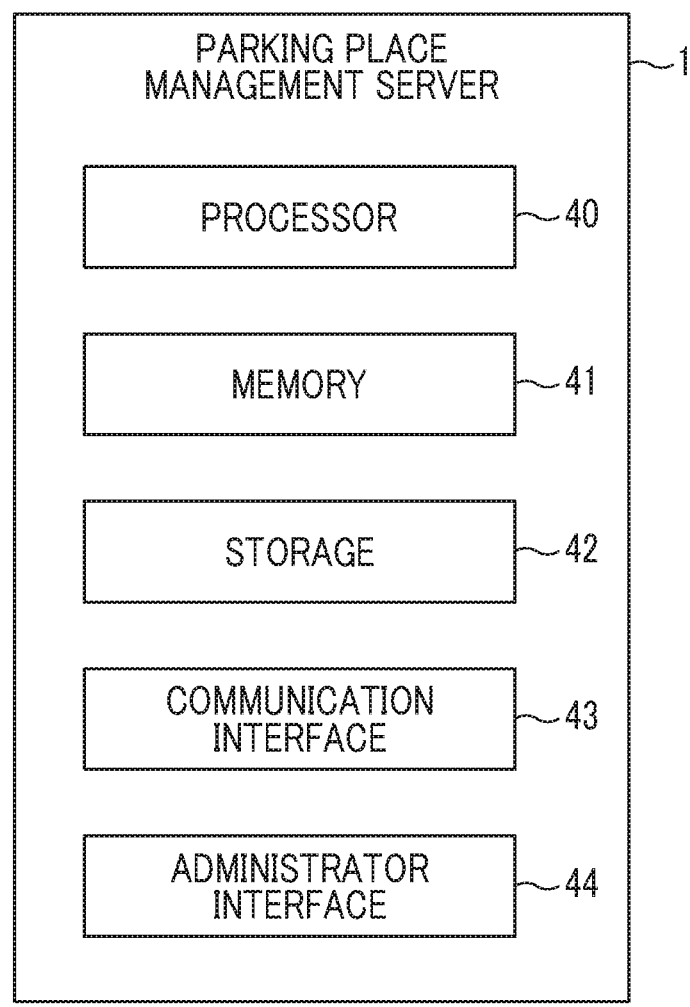
FIG. 3 is a block diagram illustrating an example of a hardware configuration of a parking place management server.

Subsequently, a hardware configuration of the parking place management server 1 will be described. FIG. 3 is a block diagram illustrating an example of a hardware configuration of the parking place management server. As illustrated in FIG. 3, the parking place management server 1 is configured as a general computer including a processor 40, a memory 41, a storage 42, a communication interface 43, and an administrator interface 44.

The processor 40 controls the parking place management server 1 by operating various operating systems. The processor 40 is an arithmetic logic unit such as a central processing unit (CPU) including a control device, an arithmetic device, a register, and the like. The processor 40 controls the memory 41, the storage 42, the communication interface 43, and the administrator interface 44. The memory 41 is a recording medium such as a read only memory (ROM), and a random access memory (RAM). The storage 42 is a recording medium such as a hard disk drive (HDD).

The communication interface 43 is a communication device for performing wireless communication via a network. As the communication interface 43, a network device, a network controller, a network card, or the like can be used. The parking place management server 1 communicates with the autonomous driving vehicle 2 and the user frontend 3 using the communication interface 43. The administrator interface 44 is an input/output unit of the parking place management server 1 for an administrator of the parking place management server 1 or the like. The administrator interface 44 includes an output device such as a display and a speaker, and an input device such as a touch panel.

Next, a functional configuration of the parking place management server 1 will be described. As illustrated in FIG. 1, the parking place management server 1 includes a vehicle information acquisition unit 11, a vehicle status recognition unit 12, a user position determination unit 13, a pick-up request reception unit 14, and a vehicle instruction unit 15.

The vehicle information acquisition unit 11 acquires vehicle information of the autonomous driving vehicle 2 through communication with the autonomous driving vehicle 2 to be subject to automated valet parking. The vehicle information includes identification information of the autonomous driving vehicle 2 and position information of the autonomous driving vehicle 2 in the parking place. The identification information may be any information as long as it can specify each of the autonomous driving vehicles 2. The identification information may be an identification number (ID number), a vehicle number, a reservation number for automated valet parking, or the like.

The vehicle information may include the type of the autonomous driving vehicle 2 or may include a vehicle number separately from the identification information. The vehicle information may include vehicle entrance reservation information such as a vehicle entrance reservation time, or may include a scheduled pick-up time. The vehicle information may include vehicle body information such as a turning radius and a vehicle width of the autonomous driving vehicle 2, or may include information relating to the autonomous driving function of the autonomous driving vehicle 2. The information relating to the autonomous driving function may include version information of the autonomous driving.

The vehicle information may include recognition results of a traveling state of the autonomous driving vehicle 2 and an external environment. The recognition of the traveling state and the external environment will be described later. The vehicle information may include information on the remaining mileage or remaining fuel of the autonomous driving vehicle 2. The vehicle information may include fail information of the autonomous driving vehicle 2. The fail information is information relating to a vehicle abnormality that has occurred in the autonomous driving vehicle 2. The vehicle information acquisition unit 11 continuously acquires vehicle information from the autonomous driving vehicle 2 during automated valet parking.

The vehicle status recognition unit 12 recognizes the status of the autonomous driving vehicle 2 during the automated valet parking based on the vehicle information acquired by the vehicle information acquisition unit 11. The status of the autonomous driving vehicle 2 includes the position of the autonomous driving vehicle 2 in the parking place. The status of the autonomous driving vehicle 2 includes a communication status between the parking place management server 1 and the autonomous driving vehicle 2. The vehicle status recognition unit 12 may recognize the status of the autonomous driving vehicle 2 based on the captured image of the autonomous driving vehicle 2 transmitted from the parking place sensor 4.

The user position determination unit 13 determines whether or not the user frontend 3 is located in a pick-up area R or a near-pick-up area Rn based on communication with the user frontend 3. The position measurement in the user frontend 3 can be performed by using a radio wave of a beacon provided in the parking place or facility in addition to a global positioning system (GPS) or a global navigation satellite system (GNSS). The position measurement in the user frontend 3 is not particularly limited, and may be performed by another method.

The pick-up area R is a preset area including the pick-up space 63. The pick-up area R is set as an area including the pick-up zone 53 as an example. The near-pick-up area Rn is a preset area in the vicinity of the pick-up area R. As an example, the near-pick-up area Rn is set in the facility exit elevator hall (parking place-side elevator hall) 80 located on the same floor as the pick-up space 63. The near-pick-up area Rn may include elevator halls on different floors where the elevator 81 of the facility exit elevator hall 80 stops.

Figure 4:
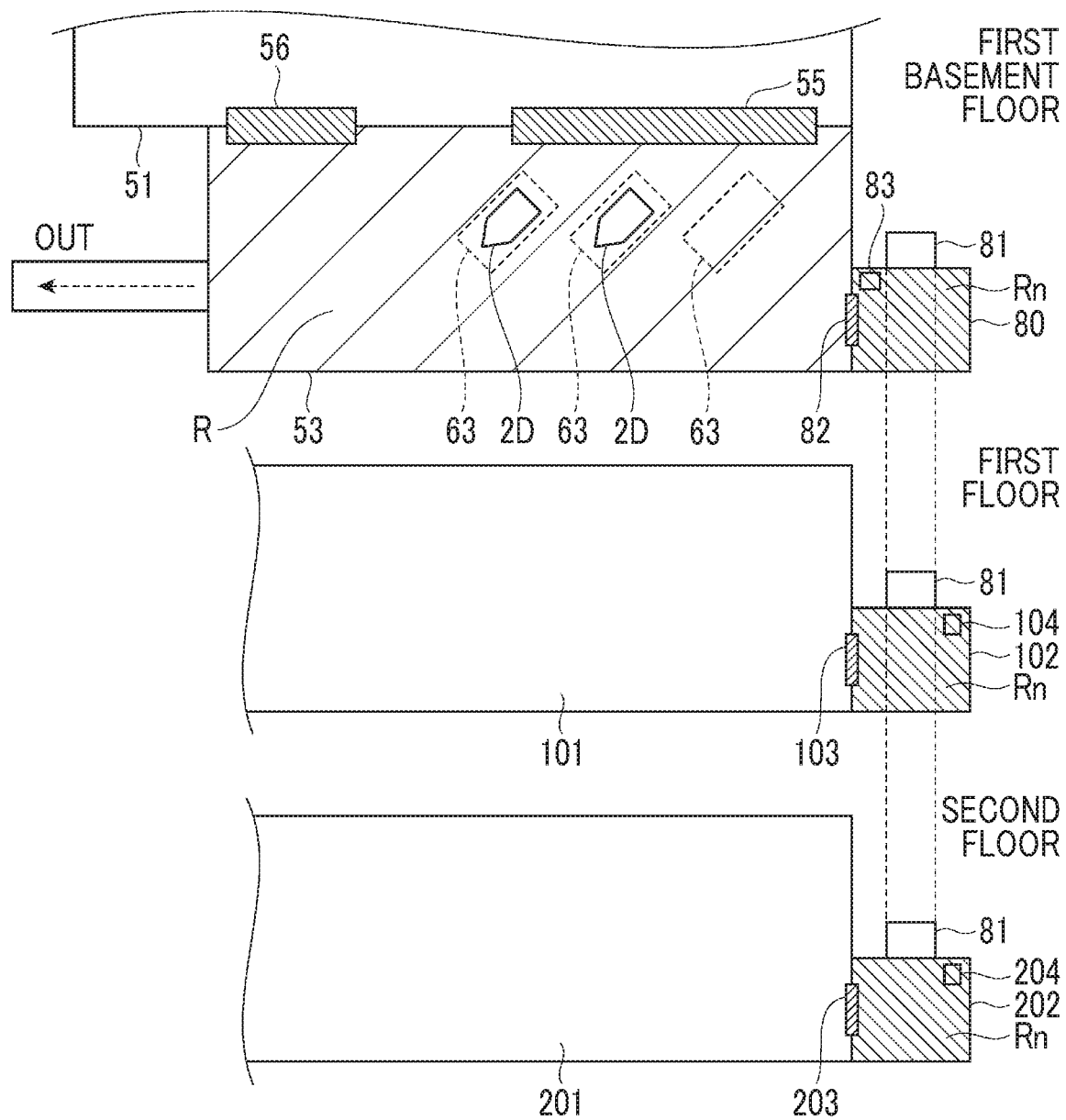
FIG. 4 is a multi-level view for describing an example of a pick-up area and a near-pick-up area.

Here, FIG. 4 is a multi-level view for describing an example of the pick-up area R and the near-pick-up area Rn. FIG. 4 illustrates a facility first floor portion 101, a first floor elevator hall (another floor elevator hall) 102, a first floor automatic door 103, and a first floor reception terminal 104.

The facility first floor portion 101 is a first floor portion of the facility having the parking place 50. The first floor elevator hall 102 is an elevator hall connected to the facility first floor portion 101. The first floor elevator hall 102 shares the elevator 81 with the facility exit elevator hall 80. The first floor elevator hall 102 is an elevator hall where the elevator 81 stops. The first floor automatic door 103 is an automatic door between the facility first floor portion 101 and the first floor elevator hall 102.

The first floor reception terminal 104 is a reception device provided in the first floor elevator hall 102 and performing short-range communication with the user frontend 3 in the first floor elevator hall 102. The first floor reception terminal 104 is connected to the exit-side reception device 83 via a network. The user can also directly operate a pick-up request to the first floor reception terminal 104.

In addition, FIG. 4 illustrates a facility second floor portion 201, a second floor elevator hall (another floor elevator hall) 202, a second floor automatic door 203, and a second floor reception terminal 204. The facility second floor portion 201 is a second floor portion of the facility having the parking place 50. The second floor elevator hall 202 is an elevator hall connected to the facility second floor portion 201. The second floor elevator hall 202 shares the elevator 81 with the facility exit elevator hall 80. The second floor elevator hall 202 is an elevator hall where the elevator 81 stops. The second floor automatic door 203 is an automatic door between the facility second floor portion 201 and the second floor elevator hall 202.

The second floor reception terminal 204 is a reception device provided in the second floor elevator hall 202 and performing short-range communication with the user frontend 3 in the second floor elevator hall 202. The second floor reception terminal 204 is connected to the exit-side reception device 83 via a network. The user may directly operate a pick-up request to the second floor reception terminal 204.

As illustrated in FIG. 4, the pick-up area R is set as, for example, an area including the entire area of the pick-up zone 53. The near-pick-up area Rn is set as an area including the facility exit elevator hall 80 located on the same floor as the pick-up space 63, and the first floor elevator hall 102 and the second floor elevator hall 202 where the elevator 81 of the facility exit elevator hall 80 stops. As described above, the near-pick-up area Rn can include the other floor elevator halls (the first floor elevator hall 102, the second floor elevator hall 202, and the like) on different floors from the pick-up space 63. The elevator 81 itself may be included in the near-pick-up area Rn.

Note that, the pick-up area R may be a part of the pick-up zone 53 as long as the pick-up area R includes the pick-up space 63. The pick-up area R may be an area including an occupant waiting space provided near the pick-up space 63 in the pick-up zone 53. The pick-up area R may include a plurality of areas. The pick-up area R may be an area including just a plurality of the pick-up spaces 63, or may be an area including the pick-up spaces 63 and an occupant waiting space individually provided for each pick-up space 63. The pick-up area R may be provided on each floor when the parking place 50 is a multi-level parking place.

The near-pick-up area Rn does not necessarily need to include all the other floor elevator halls where the elevator 81 stops. The near-pick-up area Rn may include just another floor elevator hall having a certain difference in floor number from the floor where the pick-up space 63 is located. The certain difference in floor number may be one, two, or three or more.

In addition, the near-pick-up area Rn does not need to be an area including the entire area within the facility exit elevator hall 80 and the other floor elevator halls. The near-pick-up area Rn may be an area including at least a part of the facility exit elevator hall 80. The area including at least a part of the facility exit elevator hall can be, for example, an area where short-range communication can reach the exit-side reception device 83 from the user frontend 3.

Similarly, the near-pick-up area Rn may be an area including at least a part of the other floor elevator halls. The area including at least a part of another floor elevator hall can be, for example, an area where short-range communication can reach the first floor reception terminal 104 or the second floor reception terminal 204 from the user frontend 3. In addition, the near-pick-up area Rn may be set as an area including a moving path such as a passage that is considered to pass when the user goes to the pick-up space 63, or may be set as an area within a certain range from the moving path.

Note that, when the user frontend 3 is connected to a predetermined reception device or reception terminal by short-range communication, the user position determination unit 13 may determine that the user frontend 3 is located in the pick-up area R or the near-pick-up area Rn.

The pick-up request reception unit 14 receives a pick-up request from a user. The pick-up request from the user is made through the user frontend 3. The user frontend 3 can make a pick-up request by long-range communication or short-range communication. The pick-up request from the user may be made by directly operating a reception device such as the exit-side reception device 83. The pick-up request includes information for specifying the autonomous driving vehicle 2 that is the target of the pick-up request.

The pick-up request reception unit 14 refers to the determination result of the user position determination unit 13 when the pick-up request from the user is made. When the user position determination unit 13 determines that the user frontend 3 is located in the pick-up area R or the near-pick-up area Rn, the pick-up request reception unit 14 receives the pick-up request. The pick-up request reception unit 14 notifies the user frontend 3 of a pick-up start of the autonomous driving vehicle 2.

When the user position determination unit 13 does not determine that the user frontend 3 is located in the pick-up area R or the near-pick-up area Rn, the pick-up request reception unit 14 receives a pick-up reservation without receiving the pick-up request. The pick-up reservation reception is a reception for reserving the pick-up request reception. The pick-up request reception unit 14 notifies the user frontend 3 of the pick-up reservation reception. At this time, the pick-up request reception unit 14 may obtain the user's consent for the continuous reception of the position information of the user frontend 3.

When the pick-up reservation reception is performed, the pick-up request reception unit 14 refers to the determination result by the user position determination unit 13 at regular intervals. When determination is made that the user frontend 3 that has performed the pick-up reservation reception is located in the pick-up area R or the near-pick-up area Rn, the pick-up request reception unit 14 automatically receives the pick-up request. The pick-up request reception unit 14 notifies the user frontend 3 of the pick-up start of the autonomous driving vehicle 2 based on the pick-up reservation. Thereby, the pick-up request is received even though the user does not perform the pick-up request operation again, and the pick-up of the autonomous driving vehicle 2 can be started.

The vehicle instruction unit 15 issues an instruction to the autonomous driving vehicle 2 that performs automated valet parking. The vehicle instruction unit 15 issues an instruction on a target route having the parking space 61 or the pick-up space 63 in the parking place 50 as a destination, so that the automated valet parking of the autonomous driving vehicle 2 is performed. The target route may be, for example, the shortest path from the current position of the autonomous driving vehicle 2 in the parking place 50 to the destination. Note that, the vehicle instruction unit 15 may issue an instruction on an upper limit vehicle speed and/or an upper limit acceleration in the parking place together with the target route to the autonomous driving vehicle 2. The upper limit vehicle speed and the upper limit acceleration are predetermined.

When the pick-up request reception unit 14 receives the pick-up request, the vehicle instruction unit 15 instructs the autonomous driving vehicle 2 that is the target of the pick-up request to move to the pick-up space 63 (pick-up start). The vehicle instruction unit 15 issues, for example, an instruction on a target route from the current position of the autonomous driving vehicle 2 parked in the parking space 61 to the vacant pick-up space 63, so that the pick-up of the autonomous driving vehicle 2 is started.

Subsequently, the autonomous driving vehicle 2 and the user frontend 3 that communicate with the parking place management server 1 will be described. Note that, the automated valet parking system 100 according to the present embodiment does not need to include the autonomous driving vehicle 2.

Configuration of Autonomous Driving Vehicle

As illustrated in FIG. 1, the autonomous driving vehicle 2 includes an autonomous driving ECU 20 as an example. The autonomous driving ECU 20 is an electronic control unit including a CPU, a ROM, a RAM, and the like. In the autonomous driving ECU 20, for example, a program recorded in the ROM is loaded into the RAM, and various functions are implemented by the CPU executing the program loaded into the RAM. The autonomous driving ECU 20 may include a plurality of electronic units.

The autonomous driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 transmits and receives various types of information through communication with the parking place management server 1. The communication unit 21 transmits, for example, vehicle information to the parking place management server 1 and acquires information (for example, information of a landmark along a target route) needed for automated valet parking from the parking place management server 1. In addition, the communication unit 21 performs communication with the user frontend 3 associated with the autonomous driving vehicle 2.

The external sensor 22 is an in-vehicle sensor that detects an external environment of the autonomous driving vehicle 2. The external sensor 22 includes at least a camera. The camera is an imaging device that captures an image of an external environment of the autonomous driving vehicle 2. The camera is provided, for example, behind a windshield of the autonomous driving vehicle 2 and captures an image in front of the vehicle. The camera transmits imaging information on the external environment of the autonomous driving vehicle 2 to the autonomous driving ECU 20. The camera may be a monocular camera or a stereo camera. A plurality of cameras may be provided, and in addition to the front of the autonomous driving vehicle 2, the right and left sides and the rear may be imaged.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LIDAR). The radar sensor transmits a radio wave or light to the vicinity of the autonomous driving vehicle 2 and detects the object by receiving the radio wave or light reflected by the object. The radar sensor transmits the detected object information to the autonomous driving ECU 20. In addition, the external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The actuator 24 is a device used for controlling the autonomous driving vehicle 2. The actuator 24 includes at least a drive actuator, a brake actuator, and a steering actuator. The drive actuator controls the supply amount of air to the engine (throttle opening degree) according to a control signal from the autonomous driving ECU 20 to control a driving force of the autonomous driving vehicle 2. Note that, when the autonomous driving vehicle 2 is a hybrid vehicle, the control signal from the autonomous driving ECU 20 is input to a motor as a power source in addition to the supply amount of air to the engine, so that the driving force of the autonomous driving vehicle 2 is controlled. When the autonomous driving vehicle 2 is an electric vehicle, the control signal from the autonomous driving ECU 20 is input to a motor as a power source, so that the driving force of the autonomous driving vehicle 2 is controlled. The motor as the power source in these cases forms the actuator 24.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Thereby, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a vehicle information providing unit 34, and a vehicle controller 35.

The external environment recognition unit 31 recognizes the external environment of the autonomous driving vehicle 2 based on the detection result of the external sensor 22 (the image captured by the camera or the object information detected by the radar sensor). The external environment includes a relative position of a surrounding object with respect to the autonomous driving vehicle 2. The external environment may include a relative speed and a moving direction of the surrounding object with respect to the autonomous driving vehicle 2. The external environment recognition unit 31 recognizes other vehicles and objects such as pillars of the parking place by pattern matching or the like. The external environment recognition unit 31 may recognize a parking place gate, a parking place wall, a pole, a safety cone, and the like. In addition, the external environment recognition unit 31 may recognize driving boundaries in the parking place by white line recognition.

The traveling state recognition unit 32 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the direction of the autonomous driving vehicle 2 based on the yaw rate information of the yaw rate sensor.

The vehicle position recognition unit 33 recognizes the position of the autonomous driving vehicle 2 in the parking place based on the parking place map information acquired from the parking place management server 1 through the communication unit 21 and the external environment recognized by the external environment recognition unit 31.

The vehicle position recognition unit 33 recognizes the position of the autonomous driving vehicle 2 in the parking place based on the position information of the landmark in the parking place included in the parking place map information and the relative position of the landmark with respect to the autonomous driving vehicle 2 recognized by the external environment recognition unit 31. As the landmark, an object fixed to the parking place can be used. As the landmark, for example, at least one of a parking place pillar, a parking place wall, a pole, a safety cone, and the like is used. Driving boundaries may be used as a landmark.

In addition, the vehicle position recognition unit 33 may recognize the position of the autonomous driving vehicle 2 by dead reckoning based on the detection result of the internal sensor 23. Further, the vehicle position recognition unit 33 may recognize the position of the autonomous driving vehicle 2 by communicating with a beacon provided in the parking place.

The vehicle information providing unit 34 provides vehicle information to the parking place management server 1 through the communication unit 21. The vehicle information providing unit 34 provides the parking place management server 1 with vehicle information including, for example, information on the position of the autonomous driving vehicle 2 in the parking place recognized by the vehicle position recognition unit 33 at regular intervals.

When a vehicle abnormality is detected, the vehicle information providing unit 34 provides vehicle information including fail information relating to the vehicle abnormality to the parking place management server 1. A method of detecting a vehicle abnormality (various faults) is not particularly limited, and a known method can be employed.

The vehicle controller 35 executes autonomous driving of the autonomous driving vehicle 2. In the autonomous driving, the autonomous driving vehicle 2 automatically travels along the target route instructed by the parking place management server 1. The vehicle controller 35 generates a trajectory of the autonomous driving vehicle 2 based on, for example, the target route, the position of the autonomous driving vehicle 2, the external environment of the autonomous driving vehicle 2, and the traveling state of the autonomous driving vehicle 2. The trajectory corresponds to a travel plan for autonomous driving. The trajectory includes a path along which the vehicle travels by autonomous driving and a vehicle speed plan in autonomous driving.

The path is a trajectory on which the vehicle that is being autonomously driven will travel on the target route. The path can be, for example, data of a change in the steering angle of the autonomous driving vehicle 2 according to the position on the target route (steering angle plan). The position on the target route is, for example, a set vertical position set at predetermined intervals (for example, 1 m) in the progress direction of the target route. The steering angle plan is data in which a target steering angle is associated with each set vertical position.

The vehicle controller 35 generates a trajectory so as to pass through the center of the traveling path of the parking place along the target route, for example. When the vehicle controller 35 receives the instruction on the upper limit vehicle speed from the parking place management server 1, the vehicle controller 35 generates a trajectory such that the vehicle speed plan does not exceed the upper limit vehicle speed. The vehicle controller 35 may generate the trajectory using the parking place map information acquired by communicating with the parking place management server 1.

When the stop instruction is received from the parking place management server 1, the vehicle controller 35 stops the autonomous driving vehicle 2. When a progress instruction is received from the parking place management server 1, the vehicle controller 35 allows the stopped autonomous driving vehicle 2 to progress. The example of the configuration of the autonomous driving vehicle 2 has been described above, but the autonomous driving vehicle 2 is not limited to the above contents as long as the autonomous driving vehicle 2 is capable of implementing automated valet parking.

Configuration of User Frontend

The user frontend 3 is a portable information terminal of the user associated with the autonomous driving vehicle 2. The user frontend 3 is registered in the autonomous driving vehicle 2 as the terminal of the owner of the autonomous driving vehicle 2, for example. The user frontend 3 may be a terminal of a user who is registered as an authority holder in the autonomous driving vehicle 2 by a temporary owner by rental or transfer of the instruction authority from the owner. The user frontend 3 is configured by a computer including a processor such as a CPU, a memory such as a ROM or a RAM, a communication device, and a user interface including a display and a touch panel, for example.

The user frontend 3 has a function of issuing a vehicle entrance request and a pick-up request to the parking place management server 1. By operating the user frontend 3, the user can make a vehicle entrance request and a pick-up request for the automated valet parking. For example, the user stops the autonomous driving vehicle 2 in the drop-off space 62 of the drop-off zone 52 of the parking place 50 and gets out of the vehicle, and then operates the user frontend 3 to make a vehicle entrance request by short-range communication with the entrance-side reception device 73. Similarly, when returning to the parking place 50 from the facility, the user operates the user frontend 3 to make the pick-up request by short-range communication with the exit-side reception device 83, the first floor reception terminal 104, the second floor reception terminal 204, and the like.

Processing of Automated Valet Parking System

Next, the processing of the automated valet parking system 100 will be described with reference to the drawings.

FIG. 5A is a flowchart illustrating an example of a pick-up request process in the user frontend 3. The pick-up request process can be executed after the automated valet parking of the autonomous driving vehicle 2 is started.

As illustrated in FIG. 5A, in S10, the user frontend 3 determines (recognizes) whether or not the user has performed a pick-up request operation. When determination is made that the user has performed the pick-up request operation (S10: YES), the user frontend 3 proceeds to S12. When determination is not made that the user has performed the pick-up request operation (S10: NO), the user frontend 3 ends the current process.

In S12, the user frontend 3 transmits position information of the user frontend 3 and a pick-up request to the parking place management server 1. As the position information of the user frontend 3, information acquired by a position measurement function (GPS, GNSS, beacon, or the like) of the user frontend 3 can be used. The pick-up request includes information for specifying the autonomous driving vehicle 2 that is the target of the pick-up request.

FIG. 5B is a flowchart illustrating an example of a pick-up process in the parking place management server 1. The pick-up process is performed when the pick-up request is transmitted from the user frontend 3.

As illustrated in FIG. 5B, in S20, the user position determination unit 13 determines whether or not the user frontend 3 is located in the pick-up area R or the near-pick-up area Rn, in the parking place management server 1. The user position determination unit 13 performs the position determination based on the position information of the user frontend 3. When determination is made that the user frontend 3 is located in the pick-up area R or the near-pick-up area Rn (S20: YES), the parking place management server 1 proceeds to S26. When determination is not made that the user frontend 3 is located in the pick-up area R or the near-pick-up area Rn (S20: NO), the parking place management server 1 proceeds to S22.

In S22, the pick-up request reception unit 14 receives a pick-up reservation, in the parking place management server 1. The pick-up request reception unit 14 adds the autonomous driving vehicle 2 of the user to the pick-up schedule list. In S24, the parking place management server 1 notifies the user frontend 3 of the pick-up reservation reception. Thereafter, the parking place management server 1 proceeds to a pick-up process after receiving the pick-up reservation, which will be described later.

In S26, the pick-up request reception unit 14 receives the pick-up request, in the parking place management server 1. The pick-up request reception unit 14 notifies the user frontend 3 of a pick-up start. In S28, the vehicle instruction unit 15 instructs the autonomous driving vehicle 2 to move to the pick-up space 63 (pick-up start), in the parking place management server 1.

Figure 6:
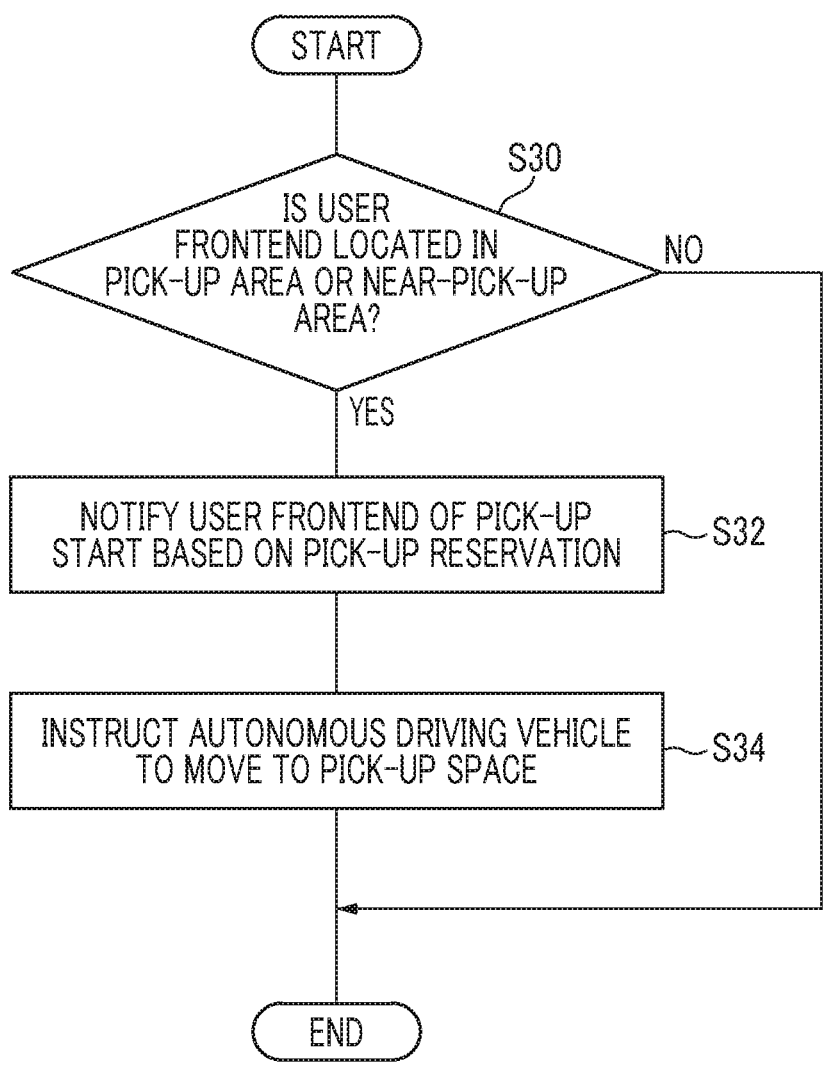
FIG. 6 is a flowchart illustrating an example of a pick-up process after receiving a pick-up reservation in the parking place management server.

FIG. 6 is a flowchart illustrating an example of a pick-up process after receiving a pick-up reservation in the parking place management server.

As illustrated in FIG. 6, in S30, the user position determination unit 13 determines whether or not the user frontend 3 is located in the pick-up area R or the near-pick-up area Rn, in the parking place management server 1. The parking place management server 1 continuously acquires position information from the user frontend 3 that is the subject of the pick-up reservation. When determination is made that the user frontend 3 is located in the pick-up area R or the near-pick-up area Rn (S30: YES), the parking place management server 1 proceeds to S32. When determination is not made that the user frontend 3 is located in the pick-up area R or the near-pick-up area Rn (S30: NO), the parking place management server 1 ends the current process. Thereafter, the parking place management server 1 performs the determination of S30 again after a lapse of a predetermined time.

In S32, the pick-up request reception unit 14 notifies the user frontend 3 of a pick-up start based on the pick-up reservation, in the parking place management server 1. The pick-up request reception unit 14 automatically receives a pick-up request. In S34, the vehicle instruction unit 15 instructs the autonomous driving vehicle 2 to move to the pick-up space 63 (pick-up start), in the parking place management server 1.

With the automated valet parking system 100 according to the present embodiment described above, when the user position determination unit 13 determines that the user frontend 3 is located in the pick-up area R or the near-pick-up area Rn including the pick-up space 63, since a pick-up request from the user frontend 3 is received and the autonomous driving vehicle 2 is instructed to move to the pick-up space 63, it is possible to suppress the autonomous driving vehicle from waiting for a long time in the pick-up space 63 due to a delay in arrival of the user as compared to the case where the pick-up request is received even though the user is not in the pick-up area R or the near-pick-up area Rn.

In addition, with the automated valet parking system 100, since the near-pick-up area Rn includes at least a part of the other floor elevator halls 102, 202 on the different floors from the parking place 50 as well as the facility exit elevator hall (parking place-side elevator hall) 80 near the parking place 50, it is possible to improve the convenience of the user as compared to the case where the pick-up reservation reception is not performed until the user gets off on the same floor as the parking place 50.

Further, with the automated valet parking system 100, since the pick-up reservation reception is performed even in a case where determination is not made that the user frontend 3 is located in the pick-up area R or near-pick-up area Rn when the pick-up request is made, since the pick-up request reception is performed, and the pick-up request is automatically received when determination is made that the user frontend 3 is located in the pick-up area R or the near-pick-up area Rn, it is possible to improve the convenience of the user as compared to the case where the user has to make a pick-up request again after entering the pick-up area R or the near-pick-up area Rn.

The embodiment of the disclosure has been described above, but the disclosure is not limited to the above-described embodiment. The disclosure can be implemented in various forms including various modifications and improvements based on the knowledge of those skilled in the art, including the above-described embodiment.

The user position determination unit 13 may be configured to determine just whether or not the user frontend 3 is located in the pick-up area R, or the user frontend 3 may be configured to determine just whether or not the user frontend 3 is located in the near-pick-up area Rn. The near-pick-up area Rn does not necessarily need to include a part of the other floor elevator halls. The form including just a part of the parking place-side elevator hall on the same floor as the parking place 50 may be used.

The pick-up request reception unit 14 does not necessarily need to perform the pick-up reservation reception. In a case where determination is not made that the user frontend 3 is located in the pick-up area R or the near-pick-up area Rn when the pick-up request is made, the pick-up request reception unit 14 may instruct the user frontend 3 that the pick-up request cannot be received. In this case, in the pick-up process of the parking place management server 1 illustrated in FIG. 5B, the user frontend 3 is notified that the pick-up request cannot be received instead of S22 and S24. Note that, the pick-up request reception unit 14 may provide a notification that the pick-up request cannot be received and a guidance notification of an area to be reached by the user in order to receive the pick-up request.

What is claimed is:

1. An automated valet parking system that automatically moves an autonomous driving vehicle to a pick-up space of a parking place by issuing an instruction to the autonomous driving vehicle parked in a parking area of the parking place according to a pick-up request from a user frontend of a user, the system comprising a processor configured to:
   acquire position information of the user frontend;
   determine whether or not the user frontend is located within a vicinity of a preset pick-up area including the pick-up space;
   instruct the autonomous driving vehicle to move to the pick-up space when, in response to receiving the pick-up request from the user, the processor determines that the user frontend is located within the vicinity of the preset pick-up area; and
   decline receiving the pick-up request such that the autonomous driving vehicle remains in the parking area when the processor determines that the user frontend is not located within the vicinity of the preset pick-up area.

2. The automated valet parking system according to claim 1, wherein the vicinity of the preset-pick-up area includes:
   at least a part of a parking place-side elevator hall located on the same floor as the pick-up space of the parking place;
   at least a part of another floor elevator hall where an elevator of the parking place-side elevator hall stops on a different floor from the parking place-side elevator hall; and
   at least a part of the elevator.

3. The automated valet parking system according to claim 1, wherein:
   in a case where the user frontend is not located within the vicinity of the preset-pick-up area when the pick-up request is made, the processor is further configured to perform a pick-up reservation reception which receives a pick-up reservation instead of the pick-up request; and
   in a case where the user frontend is located within the vicinity of the preset-pick-up area after the pick-up reservation is received, the processor is further configured to automatically receive the pick-up request.

4. The automated valet parking system according to claim 1, wherein the processor is further configured to notify the user frontend of a pick-up start of the autonomous driving vehicle.

5. The automated valet parking system according to claim 1, wherein the vicinity of the preset-pick-up area includes at least a part of a moving path for the user to go to the pick-up space.

6. The automated valet parking system according to claim 1, wherein the processor is further configured to provide a notification to the user frontend that the pick-up request cannot be received when, in response to the pick-up request from the user, the processor determines that the user frontend is not located within the vicinity of the preset pick-up area.

7. The automated valet parking system according to claim 1, wherein the processor is further configured to determine whether or not the user frontend is located within the vicinity of the pick-up area after a lapse of a predetermined time when, in response to the pick-up request from the user, the processor determines that the user frontend is not located within the vicinity of the preset pick-up area.

8. An automated valet parking method that automatically moves an autonomous driving vehicle to a pick-up space of a parking place by issuing an instruction to the autonomous driving vehicle parked in a parking area of the parking place according to a pick-up request from a user frontend of a user, comprising:

acquiring position information of the user frontend;

determining whether or not the user frontend is located within a vicinity of a preset pick-up area including the pick-up space;

instructing the autonomous driving vehicle to move to the pick-up space when, in response to receiving the pick-up request from the user, the user frontend is determined to be located within the vicinity of the preset pick-up area; and declining receiving the pick-up request such that the autonomous driving vehicle remains in the parking area when the user frontend is determined to be not located within the vicinity of the preset pick-up area.

9. The automated valet parking method according to claim 8, wherein the vicinity of the preset-pick-up area includes:

at least a part of a parking place-side elevator hall located on the same floor as the pick-up space of the parking place;

at least a part of another floor elevator hall where an elevator of the parking place-side elevator hall stops on a different floor from the parking place-side elevator hall; and at least a part of the elevator.

10. The automated valet parking method according to claim 8, wherein:

in a case where the user frontend is not located within the vicinity of the preset-pick-up area when the pick-up request is made, performing a pick-up reservation reception which receives a pick-up reservation instead of the pick-up request; and in a case where the user frontend is located within the vicinity of the preset-pick-up area after the pick-up reservation is received, automatically receiving the pick-up request.

11. The automated valet parking method according to claim 10, further comprising continuously receiving the position information from the user frontend in response to receiving a user consent.

12. The automated valet parking method according to claim 8, further comprising notifying the user frontend of a pick-up start of the autonomous driving vehicle.

* * * * *